United States Patent [19]
Eden et al.

[11] Patent Number: 5,236,977
[45] Date of Patent: Aug. 17, 1993

[54] CORRUGATING ADHESIVE CONTAINING SOLUBLE HIGH AMYLOSE STARCH

[75] Inventors: James Eden, Millstone; James Kasica, Whitehouse Station; Craig Leake, Edison, all of N.J.; Norman Lacourse, Indianapolis, Ind.; Paul Altieri, Belle Mead, N.J.

[73] Assignee: National Starch and Chemical Investment Holding Corporation, Wilmington, Del.

[21] Appl. No.: 764,559

[22] Filed: Sep. 20, 1991

[51] Int. Cl.$^5$ .............................. C08L 3/00
[52] U.S. Cl. ...................... 524/49; 524/47; 106/210; 106/213
[58] Field of Search ............ 524/47, 49; 106/210, 106/213

[56] References Cited

U.S. PATENT DOCUMENTS

| | | | |
|---|---|---|---|
| 3,300,360 | 1/1967 | Williams et al. | 156/292 |
| 3,487,033 | 12/1969 | McElmury et al. | 260/17.3 |
| 3,728,141 | 4/1973 | Chaudhuri et al. | 106/213 |
| 3,944,428 | 3/1976 | Schoenberg et al. | 106/213 |
| 4,018,959 | 4/1977 | Demko et al. | 428/182 |
| 4,280,851 | 7/1981 | Pitchon et al. | 127/33 |
| 4,297,144 | 10/1981 | Klein et al. | 106/197 |
| 4,329,181 | 5/1982 | Chiu et al. | 106/213 |
| 4,343,654 | 8/1982 | Ware et al. | 106/213 |
| 4,366,275 | 12/1982 | Silano et al. | 106/213 |
| 4,374,217 | 2/1983 | Miyake et al. | 106/213 |
| 4,400,480 | 8/1983 | Silano et al. | 524/47 |
| 4,424,291 | 1/1984 | Leake et al. | 524/47 |
| 4,600,472 | 7/1986 | Pitchon et al. | 159/4.4 |
| 4,610,760 | 9/1986 | Kirkpatrick et al. | 159/4.01 |
| 4,775,706 | 10/1988 | Iovine et al. | 524/47 |
| 4,787,937 | 11/1988 | Leake | 106/213 |

FOREIGN PATENT DOCUMENTS 645979 7/1962 Canada .................. 106/213

OTHER PUBLICATIONS

R. H. Williams, C. H. Leake and M. A. Silano, *Influence of Carrier Starch on Green Bond Strength in Corrugating Adhesives*, The Journal of the Technical Association of the Pulp and Paper Industry, vol. 60, No. 4, Apr. 1977, pp. 86-89.

*Primary Examiner*—Paul R. Michl
*Assistant Examiner*—LaVonda DeWitt
*Attorney, Agent, or Firm*—Mary E. Porter; Edwin M. Szala

[57] ABSTRACT

Corrugating adhesive compositions comprising soluble high amylose starch as the carrier starch may be prepared as a one-piece, dry mixture that can be dispersed in water at 25° to 55° C. and applied to paperboard without further preparation steps. The corrugating adhesives may be prepared without alkali, and used at any pH.

18 Claims, No Drawings

CORRUGATING ADHESIVE CONTAINING SOLUBLE HIGH AMYLOSE STARCH

BACKGROUND OF THE INVENTION

This invention relates to a starch based corrugating adhesive composition containing soluble high amylose starch as the carrier starch. The high amylose starch is rendered soluble before it is added to the adhesive. The adhesive may be provided in the form of a "one piece" dry mixture and used without first cooking the carrier starch in alkali. The use of alkali or borax in the dry mix is optional, and the adhesive is pH independent.

This invention also relates to a process for manufacturing corrugated paperboard employing a high amylose starch based corrugating adhesive that is provided as a one piece dry mixture and prepared for use in corrugating by simply dispersing the dry mixture in water at 25° to 55° C.

The manufacture of corrugated paperboard usually involves a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips, an adhesive bond is formed between the strips. This produces a single-faced board in that the facing is applied to only one surface. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use of corrugators in general are described in U.S. Pat. Nos. 2,102,937 and 2,051,025 to Bauer.

The particular adhesive employed in the corrugating process is selected on the basis of several factors, including the type of bond required in the box, package, or other item in which the finished corrugated product is to be used. Starch-based adhesives are most commonly used due to their desirable adhesive properties and low cost.

The most commonly used starch based corrugating adhesives is an alkaline adhesive which is comprised of raw, ungelatinized starch (raw starch) suspended in an aqueous dispersion of cooked starch (carrier starch). The adhesive is produced by gelatinizing starch in water with sodium hydroxide (or other alkali) to yield a primary mix of gelatinized or cooked carrier starch, which is then slowly added to a secondary mix of raw starch, borax and water to produce the full-formulation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond.

There are different theories regarding the respective roles of the raw and the carrier starches in the development of adhesive properties, but there is substantial evidence to support the view that the carrier contributes to the bond strength and set speed of the adhesive, and that good tack in the carrier leads to good tack in the adhesive and, therefore, improved runnability in the full-formulation adhesive. (See R. Williams, C. Leake and M. Silano, *TAPPI*, Vol. 60 No. Apr. 4, 1977, pp. 86-89.)

It has been known for many years that a corrugated adhesive whose carrier portion is prepared from a high amylose starch (i.e., at least 40% amylose) is superior to one prepared from pearl starch, which contains about 27% amylose, because a carrier can be produced having improved rheological and film-forming properties, and increased moisture resistance. There are strong indications that the tack of the carrier also plays an important role in the corrugating process. Furthermore, improvements in tack (green bond strength) permits higher corrugating machine speeds as compared to corrugating adhesives known in the prior art. Improved high amylose starch based corrugating adhesives are disclosed in U.S. Pat. No. 4,787,937, issued Nov. 29, 1988, to Leake, which is hereby incorporated by reference.

U.S. Pat. No. 3,487,033, issued Dec. 30, 1969, to D. E. McElmury, describes a process for producing a single starch component adhesive by reaction of the ungelatinized starch in alkali and water in specified proportions and under heat conditions to provide a suspension of starch containing primarily ungelatinized starch in partially swollen form. This process requires complex preparation steps by the manufacturer of corrugated paperboard. In the absence of a crosslinking agent (e.g., urea formaldehyde or a crosslinking resin), the adhesive prepared by this process does not provide water resistance.

Commercial corrugating operators typically purchase the raw and carrier starches, alkali and other adhesive components as separate items, then cook the carrier starch in alkali and water and, in a separate step, add the raw starch and other components to the cooked carrier starch to form the adhesive before running the corrugating operation. The alkali used in cooking the carrier starch advantageously lowers the starch gelatinization temperature, and is particularly advantageous when high amylose starch is employed as the carrier starch. High amylose starch requires a higher cooking temperature for gelatinization than other starches (e.g., in the absence of alkali, 135° to 170° C. is required for high amylose starch versus 70° to 80° C. to gelatinize other starches). Without sufficient alkali, the high amylose carrier starch cannot be gelatinized by the corrugating operator using an atmospheric pressure cook. Cooking at greater than atmospheric pressure is needed. Thus, the alkali cook has become a highly desirable component of the starch based corrugating adhesives known in the art, and an essential component of those adhesives comprising high amylose starch.

Smaller amounts of alkali are used as a component of conventional liquid adhesives that do not contain high amylose starch to optimize adhesive performance.

It has been discovered that by selection of certain soluble high amylose starches that have been pregelatinized by an extrusion process, a coupled jet-cooking/spray-drying process, a steam-injection/atomization spray-drying process, or other, similar processes, a pH independent, high amylose starch corrugating adhesive may be prepared and delivered as a one-piece dry mixture. These soluble high amylose starches also may be used separately to provide the carrier starch component of a corrugating adhesive without first cooking the starch in alkali. The carrier component can be prepared simply by dispersing the soluble high amylose starch in water at 25° to 55° C.

One-piece dry mixtures have been used commercially, however, high amylose starch has never been used in these mixtures. Until now, high amylose starch could not be used effectively in a one-piece corrugating adhesive because of the extreme cooking conditions needed to disperse the high amylose starch.

Thus, the adhesives of this invention offer the convenience of a dry mixture that can be dispersed in hot or cold water without cooking, independent of pH, together with the adhesive strength, water resistance, higher corrugator speed and set speed and other benefits associated with high amylose starch. Because these adhesives can be used without alkali, they exhibit better water resistance and do not require the use of a cross-linking agent to obtain a water resistant corrugated paperboard.

SUMMARY OF THE INVENTION

This invention provides a corrugating adhesive composition, comprising an effective amount of a raw starch, and as a carrier starch, an effective amount of a soluble high amylose starch, containing at least 40% by weight of amylose, wherein the soluble high amylose starch is (a) a spray-dried, non-granular starch, characterized in that the starch is substantially non-crystalline, substantially non-retrograded, and fully pre-dispersed; (b) a spray-dried uniformly gelatinized starch in the form of granular indented spheres, with at least a majority of the granules being whole and unbroken, these starch granules being in the form of loosely-bound agglomerates or individual granules; or (c) an extruded, non-granular starch, characterized in that the starch is fully pre-dispersed; or (d) a mixture thereof, and an effective amount of water. Effective amounts include 60 to 95% raw starch, and 5 to 40% high amylose starch, based on the dry weight of the adhesive. To form the liquid adhesive, about 60-80% of water, based on the total weight of the adhesive, is added to the dry adhesive.

This invention provides a process for preparing corrugated paperboard, wherein the conventional step of cooking the high amylose carrier starch in alkali is eliminated.

This invention further provides a dry mixture of the corrugating adhesive composition herein and a process for using this adhesive dry mixture by merely dispersing it in hot or cold water prior to application to the paperboard.

The corrugating adhesive composition optionally contains alkali, borax, crosslinking agents, and other components traditionally used in starch based corrugating adhesives.

DESCRIPTION OF THE PREFERRED EMBODIMENTS

The raw starch component of the adhesive may be derived from corn, potato, wheat, waxy maize, milo, or tapioca starch. Adhesives formulated with native high amylose starch as the raw starch can be used, but generally exhibit poorer tack and do not run as well in corrugation. The raw starch component may be derived from modified ungelatinized starches, such as oxidized, converted and chemically derivatized (e.g., starch ethers or esters) starches of the group described above.

The raw starch component may be used at concentrations of 60 to 95%, preferably 65 to 80%, based on the weight of the dry adhesive. The carrier starch component may be present at 5 to 40%, preferably 15 to 25% of the dry adhesive.

The carrier component of the adhesive comprises a high amylose starch, i.e., a hybrid corn starch having an amylose content of at least 40%. In the alternative, blends of high amylose starches and other starches having an amylose content below 40% are permissible. For purposes herein, the starch blend of the carrier component should contain at least 40% and preferably 50% by weight of amylose, and the high amylose starch (or blend thereof) employed as the carrier is used in an amount of from about 5 to 40% based on the weight of the dry adhesive.

Prior to use in the adhesive, the high amylose starch must be rendered soluble in hot or cold water (e.g., at a water temperature of about 25° to 55° C., or higher). As used herein, "soluble" means that the starch in powdered form may be readily hydrated and dispersed in hot or cold water or other aqueous medium to provide a starch solution in the form of a complex colloidal dispersion, rather than true molecular solution. One of three processes is preferably used to provide a fully gelatinized, fully functional high amylose starch: (1) an extrusion process; (2) a coupled jet-cooking/spray-drying process; or (3) a steam-injection/dual- or single-atomization spray-drying process.

In the first process, the extrusion process, the total moisture content of the high amylose starch prior to extrusion should be at a level of 21% or less by weight, based on the dry weight of the starch. Total moisture or water content includes both the residual moisture of the starch, that is the amount picked up while stored at ambient conditions, and the amount of water fed to the extruder. Typically, starch, and particularly high amylose starch, contains about 9 to 12% residual moisture. Enough water must be present to allow the material to be processed, mixed and heated to the desired temperatures. While some water may be added to the extruder, preferably only an amount which will bring the total moisture level to 21% or less is added. Accordingly, while the total moisture content that is used for carrying out the process may vary somewhat, depending on the actual material used and other process variations, a range of from about 10 to 21%, preferably from about 13 to 19% and more preferably from about 14 to 17% by weight, will generally be suitable.

During the extrusion process, the temperature of the material in the extruder will be increased to reach about 150° to 250° C. This temperature must be maintained in at least the section of the extruder closest to the die and just before the material leaves the extruder. The die is positioned at the point or location at the end of the extruder from which the extruded material exits the apparatus into the ambient air. Depending on the particular material being processed, as well as other process variations, this temperature can vary somewhat within the noted range and preferably will be from about 160° to 210° C. When modified starch such as a starch ether is used, the temperature preferably is from 160° to 180° C., whereas when an unmodified starch is used the preferred temperature is from about 170° to 210° C. in at least the section of the extruder closest to the die. By maintaining these conditions in the extruder, the material upon leaving the die and extruder outlet into the open air, expands and cools to form an expanded compressible starch product which can be ground to a particle size suitable for use in a corrugating adhesive.

The apparatus used in carrying out this process may be any screw-type extruder. While a single- or twin-screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be corotating and intermeshing or nonintermeshing. Each screw will comprise a helical flight or threaded section and typically will have a relatively deep feed section followed by a tapered transition section and a comparatively shallow constant-depth meter section. The screws, which are motor driven, generally fit snugly into the cylinder or barrel to allow mixing, heating and shearing of the material as it passes through the extruder.

Control of the temperature along the length of the extruder barrel is important and is controlled in zones along the length of the screw. Heat exchange means, typically a passage, such as a channel, chamber or bore located in the barrel wall, for circulating a heated media such as oil, or an electrical heater such as calrod or coil type heaters, is often used. Additionally, heat exchange means may also be placed in or along the shaft of the screw device.

Variations in any of the elements used in the extruder may be made as desired in accordance with conventional design practices in the field. A further description of extrusion and typical design variations can be found in *Encyclopedia of Polymer Science and Engineering*, Vol. 6, 1986, pp. 571 to 631.

In the second process, a coupled jet-cooking/spray-drying process of the type disclosed in U.S. Pat. No. 5,131,953, issued Jul. 21, 1992, to KASIC, et. al. and hereby incorporated by reference, is used to gelatinize the high amylose starch. This process comprises the steps of:

(a) forming a slurry or a paste comprising the converted or unconverted high amylose starch and water;
(b) jet-cooking the aqueous slurry or paste of the starch with steam at a temperature sufficient to fully disperse or solubilize the starch;
(c) conveying and introducing under high temperature and pressure the jet-cooked dispersion or solution into a nozzle of a spray-dryer chamber;
(d) atomizing the jet-cooked dispersion or solution through the nozzle of the spray-dryer;
(e) drying the atomized mist of the jet-cooked starch within the spray-dryer chamber; and
(f) recovering the jet-cooked and spray-dried starch as a water-dispersible or water-soluble powder.

The cooking temperature will depend upon whether a converted or unconverted starch is used. Typical temperatures are about 138°-177° C. (280°-350° F.).

The cooking chamber pressure used in the continuous coupled process is low, typically 20 to 130 psig, and is the saturation pressure of steam at the temperature used plus the small incremental pressure needed to move the dispersion through the chamber. Cooking chamber pressures suitable for high amylose starches are 80 to 150 psig, most preferably 100 to 130 psig for a starch having an amylose content of about 70%.

An essential step in the above process is the conveying of the thoroughly cooked, substantially fully dispersed starch, under elevated pressure and temperature, to the spray-dryer atomization nozzle. In the preferred method, a low shear pneumatic nozzle is used, and the transfer is carried out at substantially the same temperature and pressure used in the jet cooking. The transfer is carried out without any venting to the atmosphere. Atomization in a pneumatic nozzle may be used. The pressure of the atomization gas (steam or air) used must be sufficient for proper atomization into small droplets to allow rapid drying to an appropriate moisture without retrogradation.

Use of a pressure nozzle in the above process requires insertion of a high pressure pump (2,000 to 10,000 psig) between the jet-cooker and atomization nozzle. The temperature after passage through the high pressure pump should be maintained substantially equivalent to the jet-cooking chamber temperature. The pressure after the high pressure pump must be sufficient to properly atomize the cook to allow rapid drying to an appropriate moisture without retrogradation.

These nozzles are described in detail on page 16f in *Spray Drying: An Introduction to Principles, Operational Practice and Applications* by K. Masters (Leonard Hill Books, London, 1972).

The spray-dried starch produced by the above process is non-granular and is characterized in that it is substantially non-crystalline and substantially non-retrograded.

In the third process, the steam-injection/dual- or single-atomization cooking and spray-drying process of the type disclosed in U.S. Pat. No. 4,280,851, issued Jul. 28, 1981, to Pitchon, et al., and hereby incorporated by reference, is used to gelatinize the high amylose starch. In this process, a mixture of the granular starch is cooked or gelatinized in an atomized state. The starch which is to be cooked is injected through an atomization aperture in a nozzle assembly to form a relatively finely-divided spray. A heating medium is also injected through an aperture in the nozzle assembly into the spray of atomized material so as to heat the starch to a temperature effective to gelatinize the starch. An enclosed chamber surrounds the atomization and heating medium injection apertures and defines a vent aperture positioned to enable the heated spray of starch to exit the chamber. The arrangement is such that the lapsed time between passage of the spray of starch through the chamber, i.e., from the atomization aperture and through the vent aperture defines the gelatinization time of the starch. The resulting spray-dried pregelatinized starch comprises uniformly gelatinized starch granules in the form of indented spheres, with a majority of the granules being whole and unbroken and swelling upon rehydration. Nozzles suitable for use in the preparation of these starches are described in U.S. Pat. No. 4,610,760, issued Sep. 9, 1986, to Kirkpatrick, et al., which is hereby incorporated by reference.

A steam-injection/single atomization process for cooking and spray-drying starch is disclosed in U.S. Pat. No. 5,149,799 issued Sep. 22, 1992 to Rubens which is hereby incorporated by reference.

Other processes may be used to gelatinize the high amylose starch, provided that the process selected yields one of the following products: (1) a spray-dried, non-granular starch, characterized in that the starch is substantially non-crystalline, substantially non-retrograded, and fully pre-dispersed; (2) a spray-dried, uniformly gelatinized starch in the form of granular indented spheres, with at least a majority of the granules being whole and unbroken, these starch granules being in the form of loosely-bound agglomerates or individual granules; or (3) an extruded, non-granular starch, characterized in that the starch is fully pre-dispersed; or (4) a mixture thereof. The soluble high amylose starches described above, and combinations thereof, may be used as the carrier starch in the corrugating adhesive without first cooking in alkali.

If the corrugating adhesive is formulated with alkali, the alkali (base) is preferably caustic soda, i.e., sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

If the corrugating adhesive is formulated with boron additives, the additives may be selected from borax (sodium borate), the salts of metaborate (e.g., sodium metaborate), boric acid, and the like. Depending on the additive selected, the quantity of alkali, if present, may have to be adjusted to maintain a constant pH (e.g., more alkali is needed for boric acid).

In a preferred embodiment, the dry adhesive is formulated to comprise about 60 to 95% raw starch, 5 to 40% carrier starch (soluble high amylose starch), 0.5 to 6.0% alkali, and 0.5 to 8.0% borax. In another preferred embodiment, the dry adhesive is formulated without borax to comprise about 60 to 95% raw starch, 5 to 40% carrier starch and 0.5 to 4.0% alkali. Conventional adhesives prepared using a separate alkali cook of native high amylose carrier starch require greater concentrations of alkali in the cook. In the presence of 0.5 to 6.0% alkali, on a dry adhesive weight basis, at the dilutions used herein, native high amylose starches will not gelatinize at 25° to 55° C.

In a one piece dry mix adhesive an alkali source other than sodium hydroxide (e.g., sodium carbonate or calcium hydroxide) is preferred for stability during storage.

In an adhesive formulated without alkali, the adhesive has limited tack and is useful in applications where tack is not critical or where alkalinity is harmful to items being stored in the paperboard manufactured with the adhesive (e.g., glass items sensitive to etching with alkali). These lower pH adhesives comprising soluble high amylose starch exhibit some water resistance.

Any effective combination of alkali and borax may be used, and any conventional non-chemically functional additives may be incorporated into the adhesive herein in minor amounts, if desired. Such additives include, for example, dispersants, scale inhibitors, wetting agents, proteins, plasticizers, solubilizing agents, rheology modifiers, water conditioners, penetration control agents, peptizers such as urea, gelatinization temperature modifiers, inert fillers such as clay and finely ground polymers, thickeners such as inorganic colloidal clays, guar, hydroxyethyl cellulose, alginates, polyvinyl alcohol, polymers of ethylene oxide and the like, wet strength resins and emulsions such as polyvinyl acetate.

In the preparation of the corrugating adhesives herein, the preparation method used by the practitioner can vary without serious consequences. Unlike the adhesives known in the art, the adhesives of this invention may be prepared by dry blending the raw starch, carrier starch and, optionally, other components, dispersing the dry mix in water (usually 60 to 80% water, based on the total weight of the adhesive), and maintaining the adhesive at 25° to 55° C. during its application to the paperboard. In alkaline systems a temperature of about 50° C. is preferred. In neutral or acidic systems, a temperature of about 55° C. is preferred.

Optional ingredients, if desired, can be added at any convenient point during the preparation of either component but are usually added to the finished adhesive.

The adhesive thus obtained can be used to bond single or double-faced boards using any equipment which is presently employed for the preparation of corrugated board. Thus, the adhesive is maintained at a temperature preferably between 25° and 55° C. before its application to the protruding tips of the fluted paper strip. The actual application may be accomplished by the use of glue rolls which are ordinarily employed in most corrugating machines, or one may, if desired, utilize other application methods which may be able to achieve an effective distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

The examples which follow illustrate specific embodiments of the invention. In the examples all parts and percentages are given by weight and all temperatures in degrees Fahrenheit and Celsius. All adhesive formulations were prepared at a Stein Hall viscosity of 35 to 50 seconds.

WATER SOLUBILITY MEASUREMENT

A. Cold Water Solubility

The determination is carried out using distilled water at room temperature. About 0.5 g of starch is dispersed in 30–40 ml of water in a semi-micro stainless steel cup on a Waring blender base (Model 31B292). The blender is run at low speed while the starch is added (all at once) and then run at high speed for 2 minutes. The dispersion is immediately transferred to a 50 ml volumetric flask and diluted to 50 ml with water. A 25 ml portion of the stock dispersion (shaken well to ensure a homogenous dispersion) is removed by pipet and transferred to a 50 ml centrifuge tube. The sample is spun down at 1800–2000 rpms for 15 minutes. Once spun down, 12.5 ml of supernatant is pipetted into a 25 ml volumetric flask, 5 ml of 5N potassium hydroxide (KOH) are added with swirling, and the mixture is diluted with water. The remainder of the stock dispersion is shaken well, the insoluble starch dispersed with 10 ml of 5N KOH while swirling. The mixture is diluted to 50 ml with water. The optical rotation of both the concentrated stock solution and the supernatant solution is measured.

$$\% \text{ Cold Water Soluble} = \frac{\text{Optical Rotation of Supernatant/Path Length of Supernatant}}{\text{Optical Rotation of Stock Solution/Path Length of Stock Solution}} \times 100$$

B. Hot Water Solubility

The procedure is the same as that described above except that boiling distilled water at 90°–100° C. (194°–212° F.) is used for dispersing the starch and all subsequent dilutions. No attempt is made to maintain temperature during the procedure.

EXAMPLE 1

This example illustrates the preparation of high amylose starches that are soluble in water at 25° to 55° C.

Part A

Extrusion Process

A 70% amylose corn starch hybrid obtained from National Starch and Chemical Company was fed into a Werner and Pfleiderer twin-screw co-rotating extruder, Model ZSK-30. The extruder was equipped with a screw having a high shear screw design, a barrel diameter of 30 mm, two die openings of 4 mm diameter each, a L/D of 21:1, and oil heated barrels. The starch was fed to the extruder at a screw speed of 250 rpm and a rate of 10 kg/hr with input moisture of about 9% based on weight of starch added (residual moisture of starting starch material was 10–12%). The temperature in the extruder was increased to a level of about 200° C. in the barrel or section nearest the die and the extruder pressure was between 200–400 psi.

The product leaving the extruder was collected, allowed to cool, and ground using a commercial multipass grinder (over 94% ground material passed through a 200 mesh U.S.T.M. screen). The product had a cold water solubility of 35% and hot water solubility of 94%.

Part B

Coupled Jet-Cooking/Spray-Drying Process

The variables used for the coupled jet-cooking/spray-drying processing of unmodified high amylose (about 70% amylose) corn starch are shown below, in Table I. A slurry of unmodified granular high amylose starch was fed into a jet-cooker (Model C-15 available from National Starch and Chemical Company). Steam was metered into the slurry to cook the starch and the cooked starch was conveyed to a pneumatic atomization nozzle top mounted in a 35 foot tall, 16 foot diameter Hensey spray-dryer. Steam at 120 psig was used to atomize the starch. The atomized starch mist was dried with air at 204° C. (400° F.).

TABLE I

Process Conditions for Jet Cooking/Spray Drying High Amylose Starch

| | Part A | Part B |
|---|---|---|
| Slurry Solids | 32.0% | 26.2% |
| Cook Solids | 28.0% | 25.0% |
| Jet Cooking Temperature °C. (°F.) | 143 (290) | 163 (325) |
| Steam Flow | 9.25 lb/min | — |
| Cook Flow | 3.8 gal/min | 6.5 gal/min |
| Nozzle Type[a] | 1J-152 | 1J-152 |
| Dryer Inlet Temp °C. (°F.) | 230–191 (446–375) | 230–191 (446–375) |
| Dryer Outlet Temp °C. (°F.) | 82–96 (180–205) | 82–96 (180–205) |
| Atomizing Steam (psig) | 120 | 120 |

[a]Pneumatic nozzle obtained from Spraying System, Inc. (Model 1J; two-fluid).

The cold water solubility of the non-granular starch powder was 97.4% and the hot water solubility was greater than 99%.

Under process conditions shown above, in Table I, a converted high amylose corn starch (about 70% amylose) was processed using the coupled jet-cooking/spray-drying process. A slurry of the starch was treated with 2.5% hydrochloric acid at 52° C. (126° F.) for 16 hours to give a converted starch having a calcium chloride viscosity of 25 seconds. After neutralization with sodium carbonate to a pH of about 6, the granular converted starch was filtered, washed and dried. The starch was then jet-cooked, and the jet-cooked starch dispersion was conveyed to a pneumatic atomization nozzle top mounted in a 35 foot tall, 16 foot diameter Hensey spray-dryer. The atomized starch mist was dried with air at 204° C. (400° F.).

The converted starch powder was 93.0% soluble in cold water and 97.1% soluble in hot water.

Part C

Steam-Injection/Dual-Atomization or Single Atomization Process

Unmodified granular corn starch containing about 70% amylose was slurried in water at 33.7% solids. This slurry was pumped by a Matt and Gaulin triplex pump at about 2.4 gallons per minute under about 5,000 psig to three steam atomization nozzles (dual-atomization nozzles as described in FIG. 1 of U.S. Pat. No. 4,280,851, issued Jul. 28, 1981, to Pitchon, et al.), mounted at the top of a 35 foot tall, 16 foot diameter Hensey spray-dryer. Steam at about 154 psig was used to gelatinize and atomize the starch. Air at 230° C. (445° F.) was used to dry the atomized starch mist.

The recovered granular pregelatinized starch powder had a cold water solubility of about 83 percent and a hot water solubility of about 95 percent.

EXAMPLE 2

This example illustrates the preparation of premixed alkaline one-piece corrugating adhesives using the cold water soluble high amylose starches described above as the carrier starch.

The following components were dry mixed:

| Dry Mixture Corrugating Adhesive I | | |
|---|---|---|
| Components[c] | Percent | Grams |
| Corn starch[a] | 20.40 | 800.00 |
| Pearl corn starch[b] | 71.40 | 2,800.00 |
| Sodium Metaborate | 3.62 | 142.00 |
| Calcium Hydroxide | 1.88 | 74.00 |
| Sodium Carbonate | 2.70 | 106.00 |
| | 100.00 | 3,922.00 |

[a]Corn starch hybrid containing 70% amylose and solubilized by the methods of Example 1, above.
[b]Corn starch containing about 27% amylose that was obtained from National Starch and Chemical Company.
[c]When a crosslinker was used, it was added at 200 g/3,922 g of dry mix corrugating adhesive (4.85%) for a total dry mix of 4,122 g.

A total of 9,805 grams of water at 38° C. (100° F.) was placed in the secondary mixer of a Henry-Pratt adhesive mixer, 3,922 grams of the above dry mixture were added, and this dispersion was mixed for 20 minutes.

A total of 200 grams of a modified ketone-aldehyde resin (Dacrez ® crosslinker, obtained from National Starch and Chemical Company) (at 1.4% of total adhesive) was then mixed into the adhesive.

A control was prepared in the conventional manner using a two-stage process. In the primary mixer of a Henry-Pratt adhesive mixer, 1,200 g of a raw corn starch hybrid containing 70% amylose was cooked at 54° C. (130° F.) for 15 to 20 minutes in 2,502 g of water containing 114 g of sodium hydroxide (that had been pre-dispersed in 250.2 g of water). After cooking, 2,502 g of water at room temperature was added to the starch. In the secondary mixer, 7,756 g of water was heated to 32° C. (90° F.) and 4200 g of raw corn starch and 72 g of 5 mole borax was added to the water. The contents of the primary mixer then were dropped into the secondary mixer and blended to form the adhesive.

Single face corrugated board was then made with this adhesive on a one foot wide pilot corrugator at 250 feet per minute. Application roll gap settings were adjusted to vary the adhesive pickup. The resulting board was evaluated for adhesive strength (pin test) using a Hinde and Dauch crush tester under two test conditions: dry 24 hours after manufacture (dry pin); and wet after 24 hours submerged in room temperature tap water (wet pin). Board construction was 69 lbs/MSF (thousand square feet of board) wet strength liner and 33 lbs/MSF wet strength medium. Samples were cut into 2"×4" pieces (8 in²) for pin adhesion testing.

TABLE II

Corrugating Adhesive Strength Test

| Carrier Starch[a] | Pickup lbs/MSF[b] | Dry Pins (lb/8 in²) | Wet Pins (lb/8 in²) |
|---|---|---|---|
| Jet-Cooking/Spray-Drying | 1.0 | 131 | 8.5 |
| Process of Part B | 2.0 | 144 | 9.5 |
|  | 2.5 | 147 | 10.2 |
| Steam | 1.0 | 132 | 9.9 |
| Injection/Atomization | 2.0 | 147 | 11.3 |
| Process of Part C | 2.5 | 148 | 11.8 |
| Extrusion | 1.0 | 120 | 8.2 |
| Process of Part A | 2.0 | 141 | 10.5 |
|  | 2.5 | 147 | 11.4 |
| Extrusion | 1.0 | 120 | 0 |
| Process of Part A | 2.0 | 134 | 0 |
| No Crosslinker[d] | 2.5 | 137 | 0 |
| Conventional Cook | 1.0 | 120 | 12.0 |
| Control | 2.0 | 134 | 16.5 |
|  | 2.5 | 137 | 17.7 |

[a]Carrier starches contained 70% amylose and were solubilized by the methods of Example 1, Parts A, B and C.
[b]MSF = Thousand square feet of board.
[c]Lb/8 in² is based on sample size of 2" × 4".
[d]See Example 4, below.

These results show that the soluble high amylose starches prepared by the three methods of Example 1 can be used to formulate one piece, dry mixture corrugating adhesives which were easily prepared in conventional equipment, provided good dry strength, formulated well with conventional wet strength resins, and were readily applied using conventional corrugating equipment.

EXAMPLE 3

This example illustrates the use of soluble high amylose starches as a carrier starch in a corrugating adhesive prepared without alkali.

The adhesive was prepared and tested as in Example 2, using the following adhesive formulation.

| Dry Mixture Corrugating Adhesive II | | |
|---|---|---|
| Components | Percent | Grams |
| Corn starch[a] | 16.20 | 600.00 |
| Pearl corn starch[b] | 76.00 | 2,800.00 |
| Sodium Metaborate | 7.70 | 282.00 |
|  | 99.90 | 3,682.00 |
| Water |  | 9,580.00 |
| Crosslinker[c] |  | 200.00 |

[a]Corn starch hybrid containing 70% amylose and solubilized by the method of Example 1, Part C, above.
[b]Corn starch containing about 27% amylose that was obtained from National Starch and Chemical Company.
[c]A modified ketone-aldehyde resin (Dacrez ® crosslinker, obtained from National Starch and Chemical Company).

The crosslinker was added to the water before blending the water and dry mixture. The alkali-free adhesive strength test results were:
dry pins = 132 lbs/8 in²
wet pins = 4.5 lbs/8 in²
at a pickup of 1.5 lbs/MSF.

Thus, an acceptable, alkali-free corrugating adhesive was prepared from a one piece mixture containing soluble high amylose starch as the carrier starch.

EXAMPLE 4

This example illustrates the use of soluble high amylose starches as a carrier starch in a corrugating adhesive prepared without a crosslinking agent.

The extrusion process of Example 1, Part A, was used to solubilize a 70% amylose corn starch. The adhesive formulation of Example 2 was prepared as in Example 2, except that no crosslinker was added. Results indicated that a satisfactory adhesive was obtained without a crosslinker (see Table II).

EXAMPLE 5

This example illustrates the use of soluble high amylose starches as a carrier starch in a corrugating adhesive prepared without alkali or borax. The following components are dry mixed:

| Dry Mixture Corrugating Adhesive | |
|---|---|
|  | Percent |
| Corn starch[a] | 19.72 |
| Pearl corn starch[b] | 75.83 |

[a]Corn starch hybrid containing 70% amylose and solubilized by the methods of Example 1, above.
[b]Corn starch containing about 27% amylose obtained from National Starch and Chemical Company.

A total of 7,020 grams of water at 38° C. (100° F.) is placed in the secondary mixer of a Henry-Pratt adhesive mixer, 3,000 grams of the above dry mixture are added, and this dispersion is mixed for 20 minutes.

Single face corrugated board is made on a one foot wide pilot corrugator at 250 fpm. Application roll gap settings are adjusted to vary the adhesive pickup. The resulting board is evaluated for adhesive strength.

These results show that the soluble high amylose starches prepared by the three methods of Example 1 can be used to formulate one piece dry mix corrugating adhesives without alkali or borax. These adhesives are easily prepared in conventional equipment, provide the strength and water resistance typical of high amylose containing adhesives, formulate well with conventional wet strength resins, and can be readily applied using conventional corrugating equipment.

Now that the preferred embodiments of the present invention have been described in detail, various modifications and improvements thereon will become readily apparent to those skilled in the art. Accordingly the spirit and scope of the present invention is to be limited only by the appended claims, and not by the foregoing disclosure.

We claim:

1. A dry mixture for use as a corrugating adhesive, comprising an effective amount of a raw starch and an effective amount of a soluble high amylose starch, having at least 40% amylose, wherein the soluble high amylose starch is (a) a spray-dried, non-granular starch, characterized in that the starch is substantially non-crystalline, substantially non-retrograded, and fully pre-dispersed; (b) a spray-dried, uniformly gelatinized starch in the form of granular indented spheres, with at least a majority of the granules being whole and unbroken, these starch granules being in the form of loosely-bound agglomerates or individual granules; or (c) an extruder, non-granular starch, characterized in that the starch is fully pre-dispersed; or (d) a mixture thereof.

2. The dry mixture of claim 1, wherein the dry mixture further comprises an effective amount of alkali and an effective amount of borax.

3. The dry mixture of claim 2, wherein the dry mixture comprises about 60 to 95% of a raw starch, about 5 to 40% of the soluble high amylose starch, about 0.5 to 6.0% alkali, and about 0.5 to 8.0% borax, based on the dry weight of the adhesive.

4. The dry mixture of claim 1, wherein the dry mixture further comprises an effective amount of alkali.

5. The dry mixture of claim 4, wherein the dry mixture comprises 60 to 95% of a raw starch, 5 to 40% of the soluble high amylose starch, and 0.5 to 6.0% alkali, based on the dry weight of the adhesive.

6. The dry mixture of claim 1, wherein the dry mixture further comprises an effective amount of borax.

7. The dry mixture of claim 6, wherein the dry mixture comprises 60 to 95% of a raw starch, 5 to 40% of the soluble high amylose starch, and 0.5 to 8.0% borax, based on the dry weight of the adhesive.

8. The dry mixture of claim 1, further comprising a crosslinking agent.

9. The dry mixture of claim 8, wherein the crosslinking agent is a ketone-aldehyde resin.

10. A corrugating adhesive composition, comprising an effective amount of a raw starch, an effective amount of water, and an effective amount of a soluble high amylose starch, having at least 40% by weight of amylose, wherein the soluble high amylose starch is (a) a spray-dried, non-granular starch, characterized in that the starch is substantially non-crystalline, substantially non-retrograded, and fully pre-dispersed; (b) a spray-dried, uniformly gelatinizied starch in the form of granular indented spheres, with at least a majority of the granules being whole and unbroken, these starch granules being in the form of loosely-bound agglomerates or individual granules; or (c) an extruded, non-granular starch, characterized in that the starch is fully pre-dispersed; or (d) a mixture thereof, and wherein the soluble high amylose starch is substantially water soluble at 25° to 55° C. in the absence of alkali.

11. The corrugating adhesive of claim 10, wherein the adhesive further comprises an effective amount of alkali and an effective amount of borax.

12. The corrugating adhesive of claim 11, wherein the adhesive comprises about 60 to 95% raw starch, 5 to 40% soluble high amylose starch, 0.5 to 8.0% borax, and 0.5 to 6.0% alkali, based on the dry weight of the adhesive, and wherein the soluble high amylose starch is substantially water soluble at less than 40° C.

13. The corrugating adhesive of claim 10, wherein the adhesive further comprises an effective amount of borax.

14. The corrugating adhesive of claim 13, wherein the adhesive comprises about 60 to 95% raw starch, 5 to 40% soluble high amylose starch, and 0.5 to 8.0% borax, based on the dry weight of the adhesive.

15. The corrugating adhesive of claim 10, wherein the adhesive further comprises an effective amount of alkali.

16. The corrugating adhesive of claim 15, wherein the adhesive comprises about 60 to 95% raw starch, 5 to 40% soluble high amylose starch, and 0.5 to 6.0% alkali, based on the dry weight of the adhesive.

17. The corrugating adhesive of claim 10, further comprising a crosslinking agent.

18. The corrugating adhesive of claim 17, wherein the crosslinking agent is a ketone-aldehyde resin.

* * * * *